US011367055B2

(12) United States Patent
Deshpande et al.

(10) Patent No.: US 11,367,055 B2
(45) Date of Patent: Jun. 21, 2022

(54) DECENTRALIZED POOLED MINING FOR ENABLING PROOF-OF-WORK ON BLOCKCHAINS

(71) Applicant: International Business Machines Corporation, Armonk, NY (US)

(72) Inventors: Pralhad D. Deshpande, Singapore (SG); Yuan Yuan, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 15/730,137

(22) Filed: Oct. 11, 2017

(65) Prior Publication Data

US 2019/0108498 A1 Apr. 11, 2019

(51) Int. Cl.
*G06Q 20/06* (2012.01)

(52) U.S. Cl.
CPC ....... *G06Q 20/065* (2013.01); *G06Q 2220/00* (2013.01); *H04L 2209/38* (2013.01)

(58) Field of Classification Search
CPC .................................................. G06Q 20/065
See application file for complete search history.

(56) References Cited

U.S. PATENT DOCUMENTS

| 4,827,508 A    * | 5/1989 | Shear ...................... G06F 21/10 |
| | | 705/53 |
| 2003/0023502 A1* | 1/2003 | Senda ................ G06Q 30/0613 |
| | | 705/26.41 |

| 2015/0294308 A1  | 10/2015 | Pauker et al. |
| 2016/0218879 A1  | 7/2016  | Ferrin |
| 2016/0330034 A1* | 11/2016 | Back ....................... G06Q 20/06 |
| 2017/0075941 A1* | 3/2017  | Finlow-Bates ....... H04L 67/104 |
| 2017/0103458 A1* | 4/2017  | Pierce .................... G06Q 40/04 |
| 2017/0249606 A1* | 8/2017  | Pirooz ................... G06Q 40/02 |
| 2017/0279774 A1* | 9/2017  | Booz ................ G06F 16/24568 |
| 2017/0310653 A1* | 10/2017 | Zhang .................. H04L 9/3242 |
| 2017/0323392 A1* | 11/2017 | Kasper ................. H04L 63/123 |
| 2017/0344580 A1* | 11/2017 | King ..................... G06F 16/137 |
| 2017/0372392 A1* | 12/2017 | Metnick ............. G06Q 30/0613 |
| 2018/0109541 A1* | 4/2018  | Gleichauf ............. H04L 63/123 |
| 2018/0337769 A1* | 11/2018 | Gleichauf ............. H04L 9/3239 |
| 2019/0058581 A1* | 2/2019  | Wood .................... H04L 9/0637 |

FOREIGN PATENT DOCUMENTS

| WO | 2016029119 A1    | 2/2016 |
| WO | WO-2018026883 A1 * | 2/2018 ......... G06F 16/2365 |

OTHER PUBLICATIONS

Loi Luu, et al., SmartPool: Practical Decentralized Pooled Mining, Aug. 16, 2017, Proceedings of the 26th USENIX Security Symposium, pp. 1409-1426, available at www.usenix.org/system/files/conference/usenixsecurity17/sec17-luu.pdf (Year: 2017).*

(Continued)

*Primary Examiner* — David P Sharvin
*Assistant Examiner* — Gregory Harper

(57) ABSTRACT

An example method of operation may include one or more of identifying a number of share chains from a smart contract stored in a blockchain, identifying a contributed block received from a miner entity associated with one of the share chains, determining whether the contributed block is valid for the one share chain, and updating the one share chain based on the contributed block.

14 Claims, 7 Drawing Sheets

(56) References Cited

OTHER PUBLICATIONS

Loi Luu, et al., SmartPool: Practical Decentralized Pooled Mining (Draft v0.1), Jan. 10, 2017, pp. 1-16, available at www.smartpool.io/docs/smartpool.pdf (Year: 2017).*

Siddiq Ahmed Syed et al., SharedWealth: A Cryptocurrency to Reward Miners Evenly, Source: http://scholarworks.sjsu.edu/etd_projects/432/, 2015, Publisher: San Jose State University, Abstract, Section I and Section III.

Christopher Natoli et al., The Blockchain Anomaly, Source: 2016 IEEE 15th International Symposium on Network Computing and Applications (NCA), Publisher: IEEE, Abstract, Section 5 and 6.

* cited by examiner

DECENTRALIZED POOLED MINING FOR ENABLING PROOF-OF-WORK ON BLOCKCHAINS

TECHNICAL FIELD

This application generally relates to finalizing and committing transactions, and more particularly, to decentralized pooled mining for enabling proof-of-work on blockchains.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Miners may participate in a blockchain block completion/finalization process and be rewarded for processing the block and committing the block to an immutable ledger.

Variances of miners' payoffs for block completion can be high. This implies that miners are not all treated the same. This also makes it less desirable for new miners to create competition for established miners. Various approaches to organizing a chain structure have been used to manage blockchains via a centralized structure, a pool-to-pool structure, a smartpool, etc. Some approaches use the same number of shares in single block, others use varying batch sizes. Some approaches are managed by a central manager, some other approaches by the miners themselves.

In a conventional centralized pooled mining approach, miners aggregate resources into pools and share rewards among all pool members. Miners are asked to solve much easier pool-puzzles. Specifically, each pool-puzzle requires pool miners to find a nonce so that the hash satisfies some smaller difficulty level denoted 'd'. A solution for a pool-puzzle is referred to as a share, which has some probability of being a valid solution for the main proof-of-work (PoW) puzzle. This approach of pooled mining reduces the variance of miners' payoffs significantly and is widely adopted in popular cryptocurrencies. However, pooled mining severely degrades decentralization, since a centralized pool manager administers the pooling protocol. More than 95% of mining power in BITCOIN emanates from just about 10 mining pools. Pooled mining increases the transaction censorship significantly since pool managers decide which transactions are included in blocks. Centralized pools charge high fees to miners.

In a pool-to-pool (P2Pool) approach, an additional PoW mining protocol is used to build a share-chain. So when a miner's share is accepted by a P2Pool node it is broadcast on the P2P network to all the other nodes. If a majority of other nodes accept the share, it becomes confirmed in the share-chain. Each share also includes the reward transaction that will be used in the event that a share ends up being a valid block. That reward transaction includes direct payments to all of the recent contributors to the P2Pool network. This approach decentralizes the operation of a pool manager and requires much more computation from miners since a miner has to mine on more than one chains. Also, the reward efficiency is not optimal because of mining required on more than one chains and receiving rewards on only one chain. If less mining power is spent on securing the share-chain, then the decentralized pool would be open for attack.

In a smartpool approach, the pooled mining protocol is run as a smart contract with shares which are pre-mined, and claims to the shares are submitted in batches because submitting one share at a time is too expensive. This is accomplished using a data structure called an augmented Merkle tree. A smart contract probabilistically selects a small set of claims to be verified by share submissions from the miner. If a miner fails verification process for any claim, all claims to all shares are forfeited. This approach decentralizes the operation of the pool manager and provides security from Byzantine attacks. However, the protocol involves multiple rounds of challenge-response type communication between miner and smart contract, and thus the cost of verifying claims increases with number of shares in a batch.

SUMMARY

One example embodiment may provide a method that includes one or more of identifying a number of share chains from a smart contract stored in a blockchain, identifying a contributed block received from a miner entity associated with one of the share chains, determining whether the contributed block is valid for the one share chain, and updating the one share chain based on the contributed block.

Another example embodiment may include an apparatus that includes a processor configured to perform one or more of identify a plurality of share chains from a smart contract stored in a blockchain, identify a contributed block received from a miner entity associated with one of the plurality of share chains, determine whether the contributed block is valid for the one share chain, and update the one share chain based on the contributed block.

Still another example embodiment may provide a non-transitory computer readable storage medium that stores instructions that when executed cause a processor to perform one or more of identifying a number of share chains from a smart contract stored in a blockchain, identifying a contributed block received from a miner entity associated with one of the share chains, determining whether the contributed block is valid for the one share chain, and updating the one share chain based on the contributed block.

DETAILED DESCRIPTION

Figure 1:
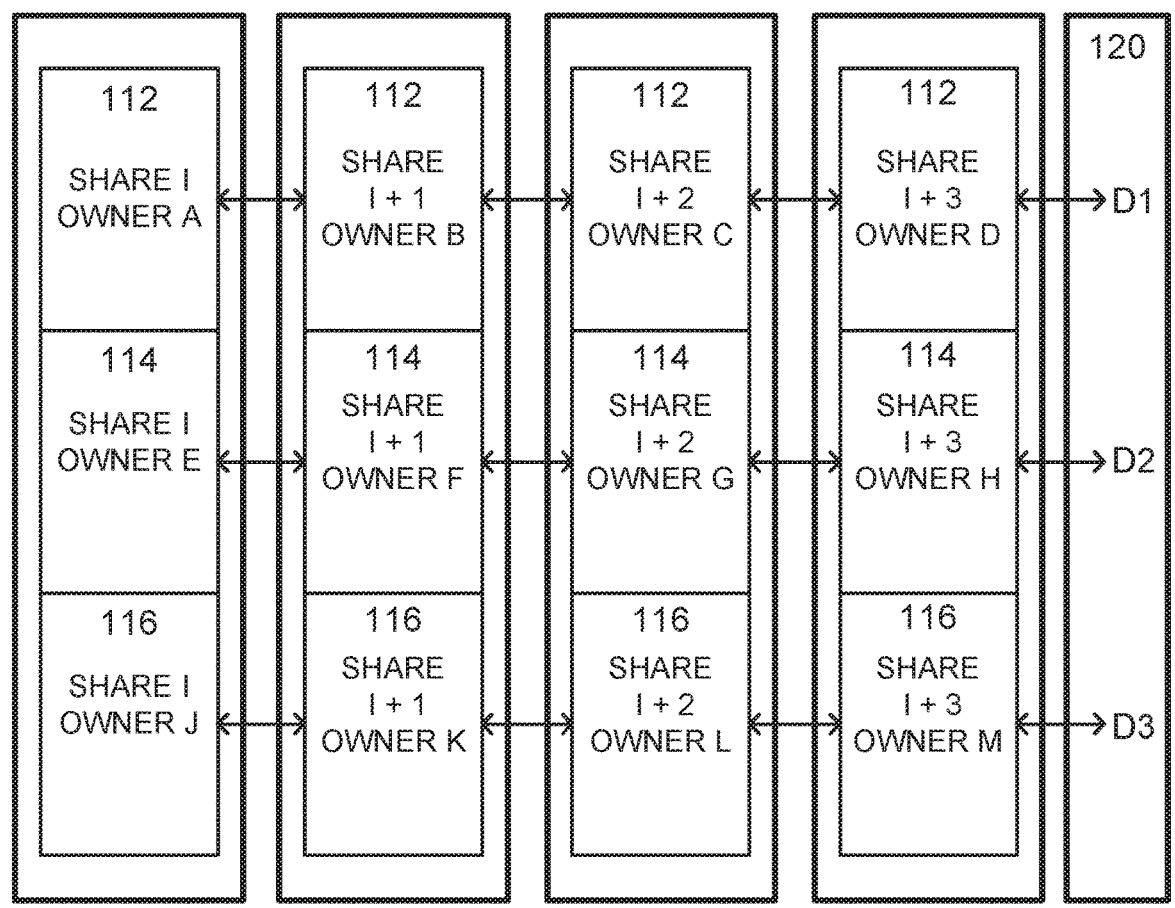
FIG. 1 illustrates a logic diagram of a share chain structure for miners, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to finalizing and committing blockchain transactions, and in another embodiment relates to using smart contracts to define a mining protocol for decentralized pooled mining and enabling proof-of-work on blockchains.

According to example embodiments, a decentralized pooled mining approach may operate a pooled mining protocol stored in an active smart contract on a blockchain, and in a manner that requires transaction fees. The smart contract maintains multiple share chains, each of different difficulty (D1, D2 . . . Dn). In operation, the various miners may subscribe to a share chain of appropriate difficulty so that it is economical for the miner's operation given their computing constraints and other factors dictating the share chain matchup, such as experience, reputation, etc. Next, the miner entity/device may submit various shares to that share chain. The input transaction data for each share chain may be different. As a result, a miner cannot claim shares on share-chains other than the one they are mining. This approach decentralizes the operation of a share pool manager, provides a constant cost for submitting shares of any difficulty, and also provides single round communication for submitting shares.

FIG. 1 illustrates a logic diagram of a share chain structure for miners, according to example embodiments. Referring to FIG. 1, the share chain configuration 100 includes three separate share chains 112, 114 and 116, each of which has a different respective level of share difficulty 120 (D1, D2, D3). In this example, there are three share chains each of which has an increasingly difficult share difficulty, however, any number of share chains may be used to attract miners according to their respective resources and interests in the proof-of-work (PoW) mining process in return for cryptocurrency rewards. As may be observed, each share chains has more than one potential owner (owners A-D, E-H and J-M), which provides flexibility and opportunity to all miners having varying resources and objectives.

According to example embodiments, the initialization process for establishing a pooled mining smart contract may include identifying each share chain available with a share_chain_id (ID). Next, a new generation (first) transaction for each share chain may be created as a parentless transaction which defines a reward or in some cases creates new cryptocurrency. Next, a different random string may be selected for each share chain as well, and a difficulty 'di' may also be selected for each share chain (e.g., d1=>20 leading 0's, d2=>30 leading 0's, . . . ).

When submitting a share, including a share_chain_id and share, a check may be performed to identify whether the share is valid for the share chain identified by share_chain_id and the puzzle of an appropriate difficulty must be solved accordingly. Also, it may be determined as to whether the share has or has not been previously submitted. If not previously submitted, the miner may receive a contribution to the share chain and the valid block may be submitted and a reward may be distributed accordingly based on the contribution.

From a miner's perspective, the generating of a new transaction may include retrieving a list of submitted and unpaid shares from a smart contract for the share-chain being mined by the respective miners. The new transaction for any of the share chains may be retrieved for the share chain that the miner is attempting to mine. The addresses, number of claimed shares and other information may then be extracted and a first transaction may be generated locally outside the blockchain. In an attempt to identify a valid share, the nonce value may be identified and incremented until a hash of the transaction and nonce yields a valid share similar to most blockchain reward configurations. If the miner finds a share, it may be submitted to the smart contract, and if a block is discovered, the block may also be submitted to the smart contract.

In this example, a system and/or a method for enabling inexpensive, decentralized pooled mining for a proof-of-work on one or more blockchains may provide a smart contract used for maintaining multiple share-chains in a smart contract that is executed on a decentralized blockchain, where each share-chain is used to collect share submissions from miners for that share-chain. In the event of discovering a block, a reward based on share submissions may be distributed. As for the miner, the miner may determine which share-chain to mine on and fetch correct first transaction data, identify a share and submit a share or block.

Figure 2:
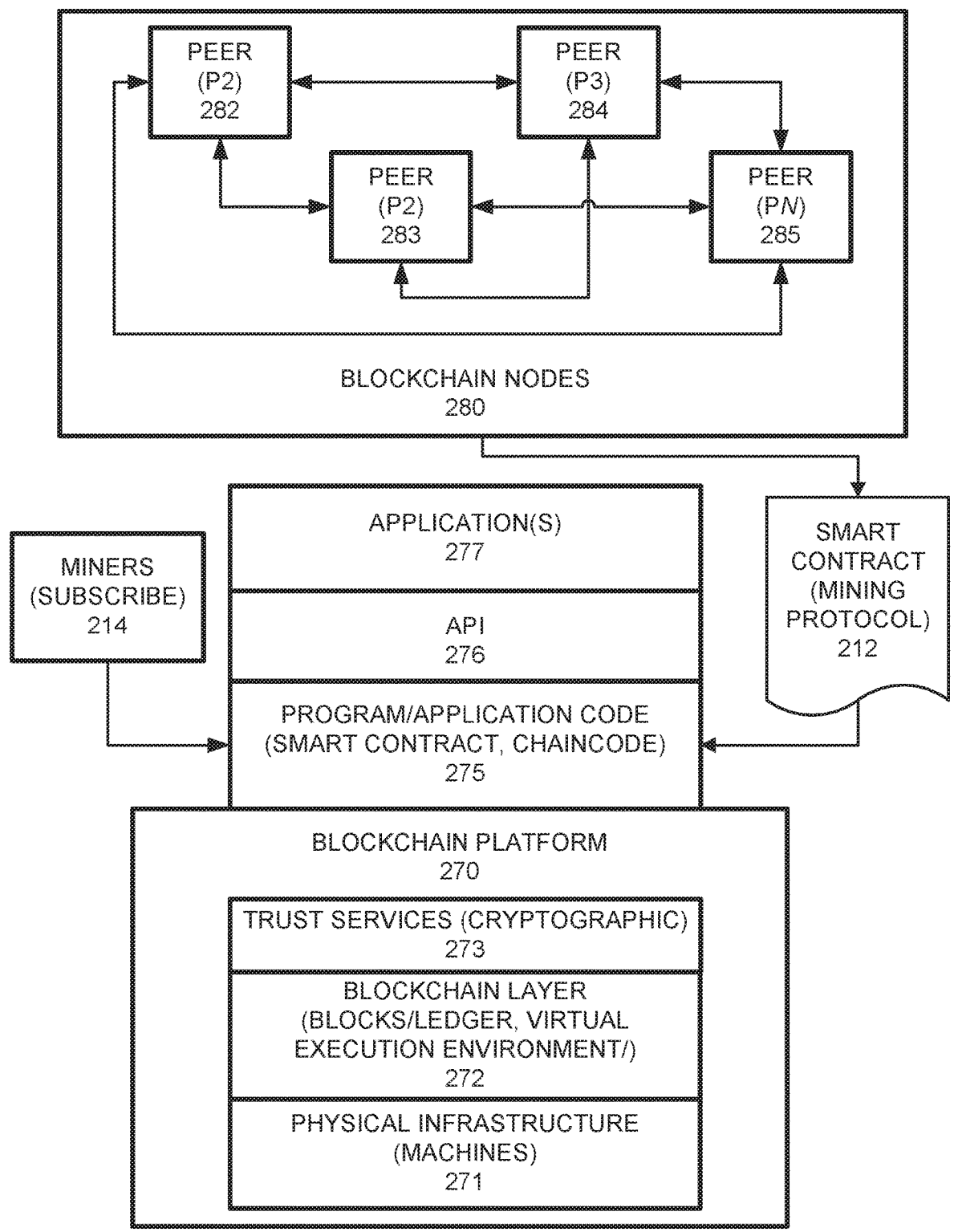
FIG. 2 illustrates an example blockchain configuration for performing pooled mining, according to example embodiments.

FIG. 2 illustrates an example blockchain configuration for performing pooled mining smart contract operations, according to example embodiments. Referring to FIG. 2, the blockchain system 200 may include certain common blockchain elements, such as a group of blockchain nodes 280, which may be assigned peer blockchain nodes 'peer nodes' 282-285, which participate in the blockchain transaction addition and validation process (consensus). Any of the blockchain peer nodes 280 may initiate new transactions and seek to write to the blockchain immutable ledger 272, a copy of which is stored on the underpinning physical infrastructure 271 of the blockchain 270. In this configuration, the customized blockchain configuration may include one or more applications 277, which are linked to APIs 276 to access and execute stored program/application code (e.g., chain code and/or smart contracts) 275. The stored program application code 275 are created according to the customized configuration sought by the participants and can maintain their own state, control its own assets, and receive external information. This code can be deployed as a transaction and installed, via appending to the distributed ledger, on all blockchain peer nodes.

The blockchain platform 270 includes the various layers of blockchain data, services (e.g., cryptographic trust services, virtual execution environment), and underpinning physical computer infrastructure necessary to receive and store new transactions and provide access to auditors, which are seeking to access data entries. The blockchain layer 272 exposes an interface that provides access to the virtual execution environment necessary to process the program code and engage the physical platform 271. Cryptographic trust services 273 are used to verify transactions and maintain private information.

The blockchain configuration of FIG. 2 may process and execute program/application code 275 by way of the interfaces exposed, and the services provided, by blockchain platform 270. The code may control blockchain assets, for example, it can store and transfer data, and may be executed by the blockchain, for example, in the form of a smart contract and associated chain code with conditions or other code elements subject to its execution. The smart contracts 275 may be created to execute reminders, updates, and/or other notifications subject to the changes, updates, etc. The smart contracts can themselves be used to identify rules associated with authorization and access requirements and usage. In one example, a smart contract may be identified and approved by the peer nodes 280. The nodes may reach consensus and permit the smart contract to be enacted as a transaction to be committed to the blockchain ledger 272 provided that certain conditions are satisfied. For example, the smart contract may require a series of initialization operations to be approved by the consensus peers. In this case, the peers may identify the smart contract 212 has been signed by all necessary parties prior to being enacted on the blockchain as a mining protocol. Thereafter, miners may access the smart contract 214 and search for appropriate shares within their share chain distribution and attempt to solve puzzles, finalize transactions and receive corresponding rewards.

Figure 3:
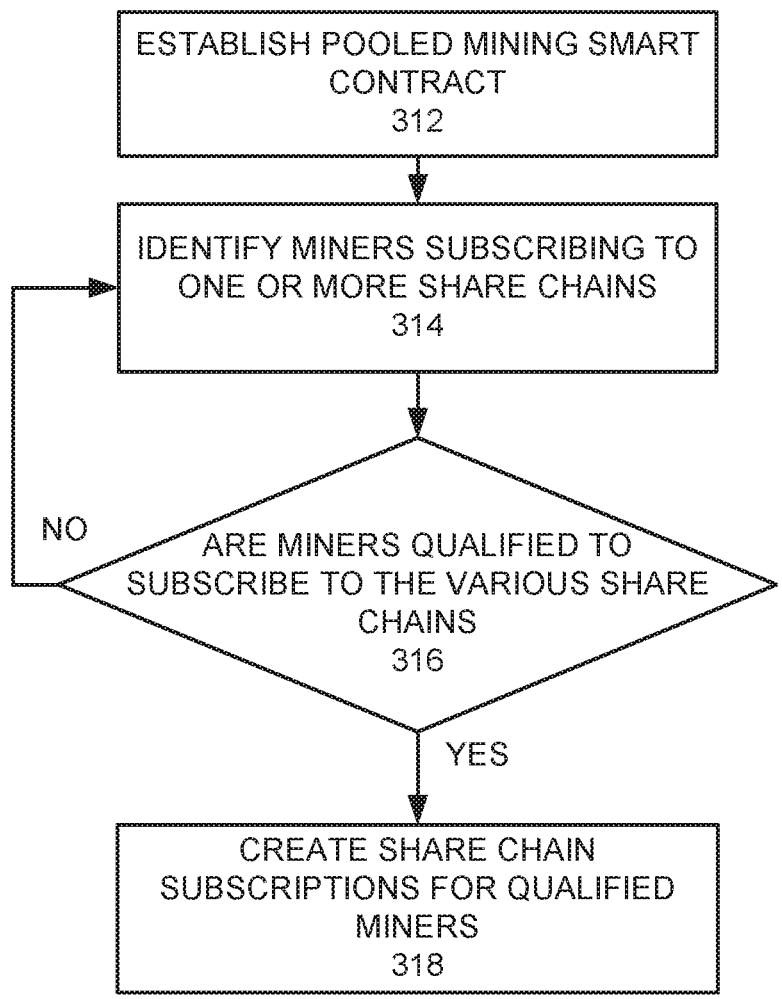
FIG. 3 illustrates a logic diagram flow diagram of a pooled mining configuration, according to example embodiments.

FIG. 3 illustrates a logic diagram flow diagram of a pooled mining configuration, according to example embodiments. Referring to FIG. 3, the method 300 may include a process of establishing and committing a smart contract to the blockchain 312 with information regarding the share chains and shares for mining. Miners subscribing to the share chains may be identified and stored for reference purposes 314. When a miner seeks to access a share and provide a finalized block or related blockchain entity, such as a PoW, the miner must be identified as belonging to the share chain 316, if not the process ends and repeats, otherwise, the qualified miner may be assigned a share chain of interest 318 depending on the qualifications and experience or via a trusted miner approach that does not verify the miner's capability. In one example, the miner's history of transactions, relative difficulty of mined transactions and other credentials may be required prior to permitting subscription rights to a particular share chain. For example, in order to obtain access to a more difficult chain identified by a difficulty rating, the miner may have to have completed PoWs or other accomplishments on less difficult chains and evidence of those efforts must be retrieved from completed blocks prior to promoting a miner ID to a more difficult chain.

Figure 4:
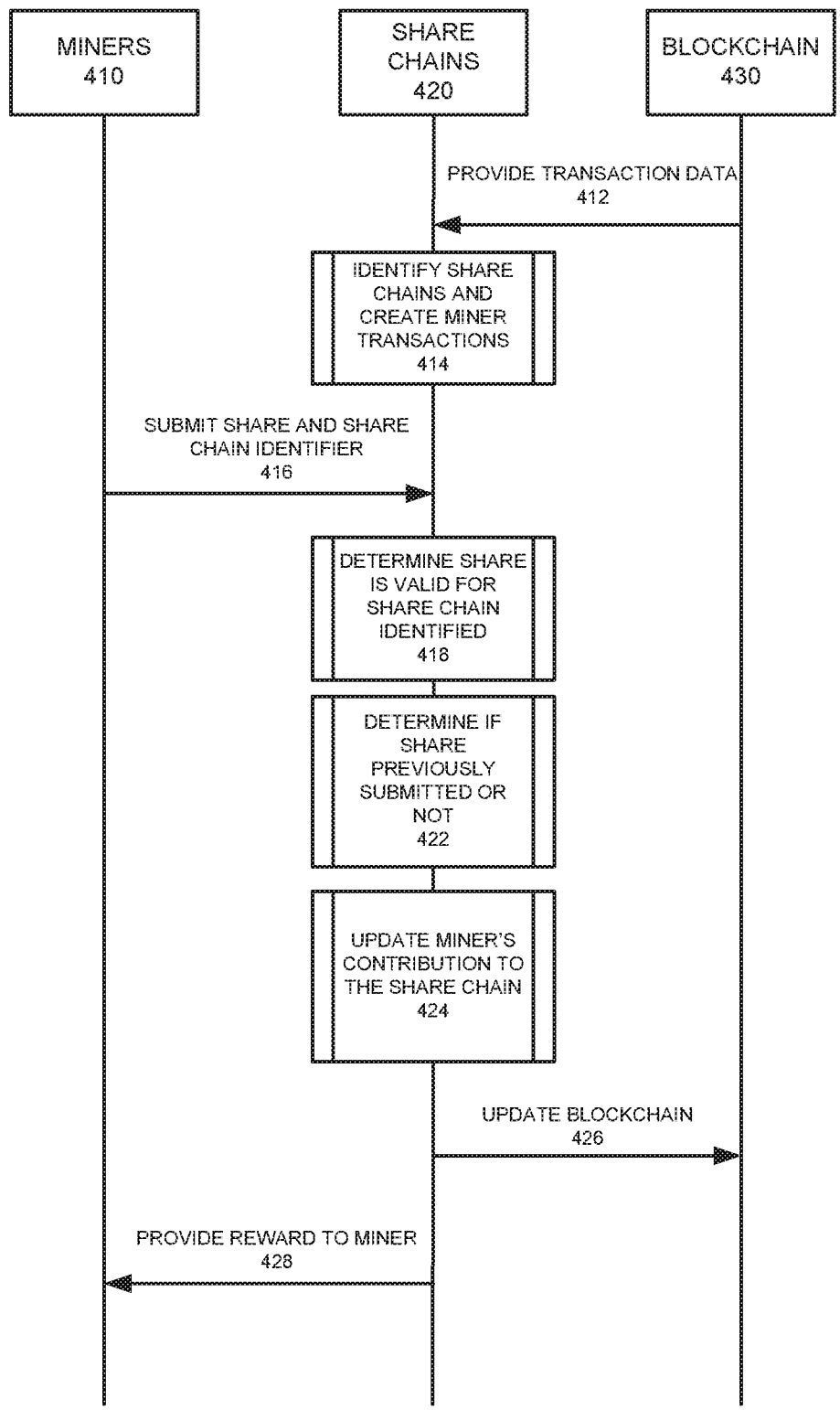
FIG. 4 illustrates a system signaling diagram for performing pooled mining, according to example embodiments.

FIG. 4 illustrates a system signaling diagram 400 for performing pooled mining, according to example embodiments. Referring to FIG. 4, the entities may include miners 410, one or more share chains 420 identified by identifiers, difficulty and various shares available to the miners, and a blockchain 430. In operation, the transaction data of the blocks may be identified 412 and setup in the share chains for share creation and share chain organization. The share may be created for the particular subscribers 414 and offered by smart contract definitions to the miners 410. The miners may identify the available shares and submit share and share chain identifier information 416 for approval. The shares received must be authenticated for correctness 418 and paired with valid miners before being permitted to be finalized in the blockchain 430. The shares must also be identified as being new or previously submitted 422 and the update 424 to the miner's contribution will only be committed 426 if the share is not previously written to the blockchain. A reward may be sent to the miner 428 once the share submitted is fully approved.

Figure 5A:
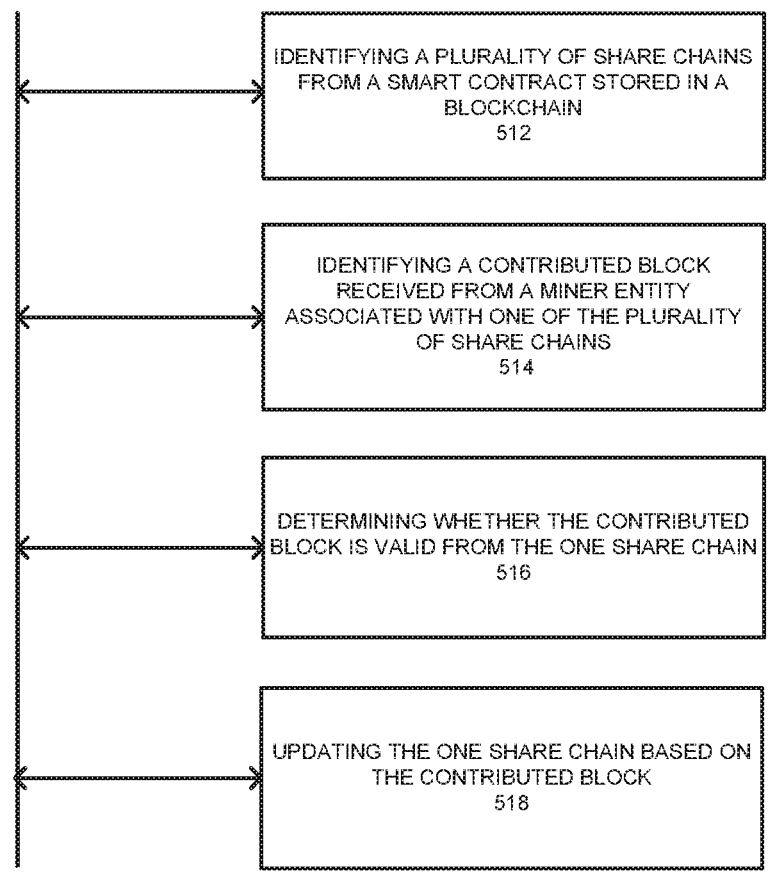
FIG. 5A illustrates an example flow diagram of performing pooled mining with a miner, according to example embodiments.

FIG. 5A illustrates an example flow diagram 500 of performing pooled mining with a miner, according to example embodiments. The method may provide identifying a plurality of share chains from a smart contract stored in a blockchain 512, identifying a contributed block received from a miner entity associated with one of the plurality of share chains 514, determining whether the contributed block is valid for the one share chain 516, and updating the one share chain based on the contributed block 518. The method may also include responsive to determining the contributed block is valid, distributing a reward to the miner based on the contributed block, identifying a plurality of share chains based on share chain identifiers, initializing new transactions for each of the respective plurality of share chains, and assigning a different difficulty level to each of the plurality of share chains based on the new transactions.

The method may also provide identifying the plurality of share chains each include the different difficulty levels. Also, determining whether the contributed block is valid includes determining whether the block is solved, determining whether the miner has subscribed to the one of the plurality of share chains, and responsive to determining the miner has subscribed to the one of the plurality of share chains, permitting the miner to be rewarded for the contributed block to the one of the plurality of share chains. The method may also include determining whether the contributed block has not been previously submitted, and responsive to determining the contributed block has not been previously submitted, distributing the reward to the miner.

Figure 5B:
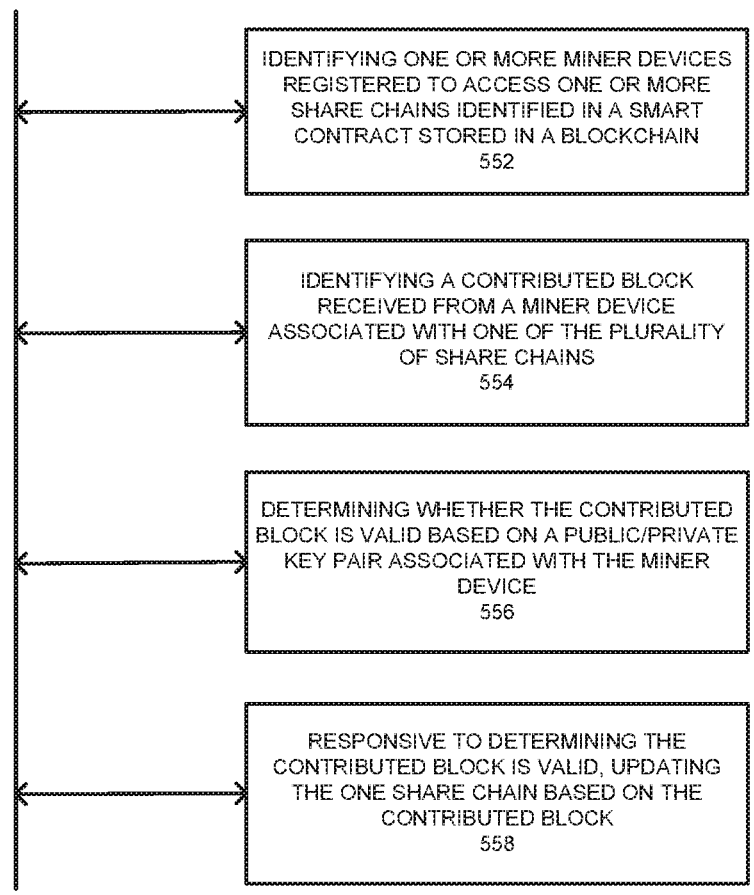
FIG. 5B illustrates another example flow diagram of performing pooled mining with a miner, according to example embodiments.

FIG. 5B illustrates another example flow diagram 550 of performing pooled mining with a miner, according to example embodiments. Referring to FIG. 5, the method may provide identifying one or more miner devices registered to access one or more share chains identified in a smart contract stored in a blockchain 552, identifying a contributed block received from a miner device associated with one of the plurality of share chains 554, determining whether the contributed block is valid based on a public/private key pair associated with the miner device 556, and responsive to determining the contributed block is valid, updating the one share chain based on the contributed block 558.

Blockchain blocks and the mining of new blocks can be limited to certain miner device profiles holding a specific set of private keys and verified by corresponding public keys. The keys are stored in software or on specific hardware devices designed to not reveal the private key. Only blocks mined using those keys are acceptable on the blockchain.

The signing of the blocks in the particular blockchain requires the miner to have the correct private keys.

In one example, a method may provide receiving, in a signing device, from a database a block, the signing device having a public/private key pair, where a private key of the public/private key pair is known only by the signing device, and a public key of the public/private key pair is known by the database. This provides the ability to create a block which can be tied to a specific device. This is performed by securely storing the private key on the device so the private key is not or cannot be exposed to any other miners or mining devices.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
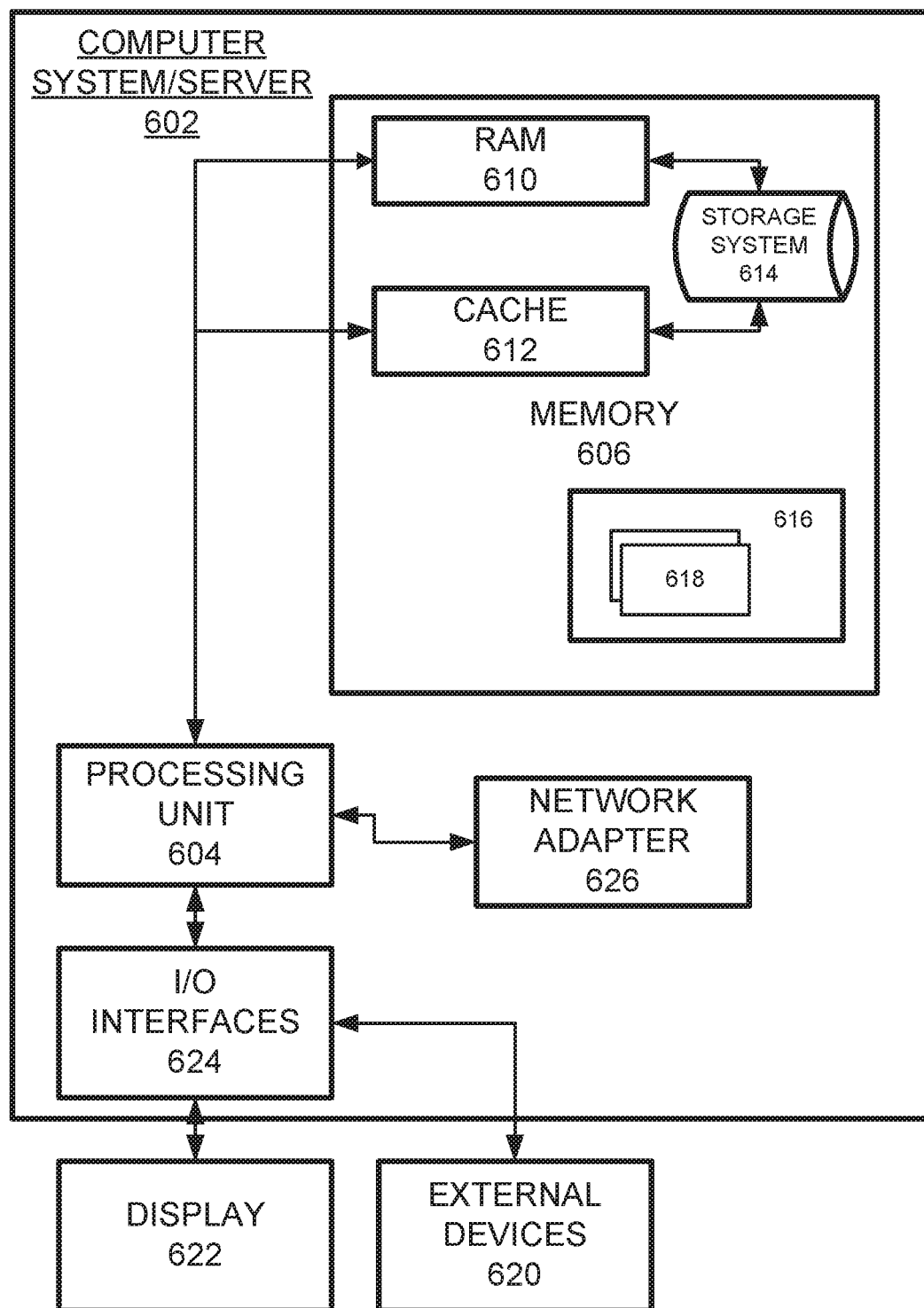
FIG. 6 illustrates an example computer system/server configured to support one or more of the example embodiments.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via the bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
receiving, by a plurality of share chains of a blockchain network, a request for a subscription from a miner of the blockchain network, each share chain, of the plurality of share chains, requiring that the miner prove that the miner can satisfy a certain level of difficulty specified by each share chain, wherein at least two share chains, of the plurality of share chains, specify different levels of difficulty;
allowing, by the plurality of share chains, the miner to subscribe to only a single share chain, of the plurality of share chains, based on the miner proving that the miner satisfies the level of difficulty specified by the single share chain;
identifying, by the single share chain, a contributed block received from the miner based on a record of previous transactions by the miner, and the contributed block having been mined using a public/private key pair associated with the miner;

identifying by the single share chain that the contributed block is valid for only the single share chain based on the public/private key pair; and updating only the single share chain with the contributed block.

2. The method of claim 1, further comprising:

distributing a reward to the miner based on identifying that the contributed block is valid.

3. The method of claim 1, further comprising:

initializing new transactions for each share chain of the plurality of share chains; and assigning a different difficulty level to each share chain of the plurality of share chains based on the new transactions.

4. The method of claim 1, further comprising:

identifying that the miner has subscribed to the single share chain; and rewarding the miner for the contributed block based on the identifying that the miner has subscribed to the single share chain.

5. The method of claim 1, further comprising:

identifying that the contributed block has not been previously submitted; and distributing the reward to the miner based on the identifying that the contributed block has not been previously submitted.

6. A plurality of share chains in a blockchain network, the plurality of share chains comprising:

a processor that when executing one or more instructions stored in a memory is configured to:

a request for a subscription from a miner of the blockchain network, each share chain, of the plurality of share chains, requiring that the miner prove that the miner can satisfy a certain level of difficulty specified by each share chain, wherein at least two share chains, of the plurality of share chains, specify different levels of difficulty;

allow the miner to subscribe to only a single share chain, of the plurality of share chains, based on the miner proving that the miner satisfies the level of difficulty specified by the single share chain;

identify, by the single share chain, a contributed block received from the miner based on a record of previous transactions by the miner, and the contributed block having been mined using a public/private key pair associated with the miner;

identifying by the single share chain that the contributed block is valid for only the single share chain based on the public/private key pair; and; and update only the single share chain with the contributed block.

7. The apparatus of claim 6, wherein the processor is further configured to:

distribute a reward to the miner based on an identification that the contributed block is valid.

8. The apparatus of claim 6, wherein the processor is further configured to:

initialize new transactions for each share chain of the plurality of share chains; and assign a different difficulty level to each share chain of the plurality of share chains based on the new transactions.

9. The apparatus of claim 6, wherein the processor is further configured to:

identify that the miner has subscribed to the single share chain; and rewarding the miner for the contributed block based on the identifying that the miner has subscribed to the single share chain.

10. The apparatus of claim 6, wherein the processor is further configured to:

identify that the contributed block has not been previously submitted; and distribute the reward to the miner based on the identification that the contributed block has not been previously submitted.

11. A non-transitory computer readable storage medium configured to store one or more instructions that when executed by a processor implementing a plurality of share chains in a blockchain network cause the processor to perform:

receiving a request for a subscription from a miner of the blockchain network, each share chain, of the plurality of share chains, requiring that the miner prove that the miner can satisfy a certain level of difficulty specified by each share chain, wherein at least two share chains, of the plurality of share chains, specify different levels of difficulty;

allowing the miner to subscribe to only a single share chain, of the plurality of share chains, based on the miner proving that the miner satisfies the level of difficulty specified by the single share chain;

identifying, by the single share chain, a contributed block received from the miner based on a record of previous transactions by the miner, and the contributed block having been mined using a public/private key pair associated with the miner;

identifying by the single share chain that the contributed block is valid for only the single share chain based on the public/private key pair; and updating only the single share chain with the contributed block.

12. The non-transitory computer readable storage medium of claim 11, wherein the one or more instructions further cause the processor to perform:

distributing a reward to the miner based on identifying that the contributed block is valid.

13. The non-transitory computer readable storage medium of claim 11, wherein the one or more instructions further cause the processor to perform:

initializing new transactions for each share chain of the plurality of share chains; and assigning a different difficulty level to each share chain of the plurality of share chains based on the new transactions.

14. The non-transitory computer readable storage medium of claim 11, wherein the one or more instructions further cause the processor to perform:

identifying that the miner has subscribed to the single share chain; and rewarding the miner for the contributed block based on the identifying that the miner has subscribed to the single share chain;

identifying that the contributed block has not been previously submitted; and distributing the reward to the miner based on the identifying that the contributed block has not been previously submitted.

\* \* \* \* \*